(12) United States Patent
Kontkanen

(10) Patent No.: US 9,183,666 B2
(45) Date of Patent: Nov. 10, 2015

(54) SYSTEM AND METHOD FOR OVERLAYING TWO-DIMENSIONAL MAP DATA ON A THREE-DIMENSIONAL SCENE

(71) Applicant: Janne Kontkanen, San Francisco, CA (US)

(72) Inventor: Janne Kontkanen, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 191 days.

(21) Appl. No.: 13/834,474

(22) Filed: Mar. 15, 2013

(65) Prior Publication Data

US 2014/0267279 A1  Sep. 18, 2014

(51) Int. Cl.
*G06T 15/04* (2011.01)
*G06T 17/05* (2011.01)
*G06T 19/00* (2011.01)

(52) U.S. Cl.
CPC .......... *G06T 15/04* (2013.01); *G06T 17/05* (2013.01); *G06T 19/00* (2013.01)

(58) Field of Classification Search
CPC ..... G06T 11/001; G06T 15/04; G06T 19/003; G06T 15/20; G06T 15/205; G06T 19/006; G06T 3/0031; G06T 3/0043
See application file for complete search history.

(56) References Cited

U.S. PATENT DOCUMENTS

| | | | |
|---|---|---|---|
| 7,420,557 B1 | 9/2008 | Moreton | |
| 8,902,288 B1 * | 12/2014 | Fan et al. | 348/46 |
| 9,001,116 B2 * | 4/2015 | Ben-David et al. | 345/419 |
| 2003/0048277 A1 | 3/2003 | Maillot et al. | |
| 2005/0073532 A1 | 4/2005 | Scott et al. | |
| 2005/0102095 A1 | 5/2005 | Vanegas et al. | |
| 2005/0156928 A1 | 7/2005 | Santodomingo et al. | |
| 2005/0177350 A1 | 8/2005 | Kishikawa | |
| 2005/0265619 A1 | 12/2005 | Ozaki | |
| 2006/0109267 A1 | 5/2006 | Rybacki et al. | |
| 2006/0284889 A1 | 12/2006 | Cosman et al. | |
| 2008/0122856 A1 | 5/2008 | Boyd et al. | |
| 2008/0221843 A1 | 9/2008 | Shenkar et al. | |
| 2010/0010782 A1 | 1/2010 | Zhu et al. | |
| 2012/0019513 A1 | 1/2012 | Fong et al. | |
| 2012/0041722 A1 | 2/2012 | Quan et al. | |
| 2014/0172295 A1 | 6/2014 | Denigan et al. | |

OTHER PUBLICATIONS

Lu et al., "A Hybrid Conditional Random Field for Estimating the Underlying Ground Surface from Airborne LiDAR Data," *IEEE Transactions of Geoscience and Remote Sensing*, 1-11 (2009).
Schpok, "Geometric Overpass Extraction from Vector Road Data and DSMs," *ACM SIGSPATIAL GIS 2011*, Nov. 1-4, 2011 (6 pages).

(Continued)

*Primary Examiner* — Antonio A Caschera
(74) *Attorney, Agent, or Firm* — Marshall, Gerstein & Borun LLP

(57) ABSTRACT

A method for augmenting a three-dimensional (3D) scene with two-dimensional (2D) map data includes receiving 3D map data having a 3D geometry data and imagery texture data. For a specified perspective of a virtual camera in a 3D coordinate system, geometry of the 3D scene is rendered using the 3D geometry data, wherein the specified perspective includes a position and orientation relative to the 3D scene. A map texture is generated using the 2D map data in accordance with the perspective of the virtual camera in the 3D coordinate system, and the imagery texture and map texture are applied to the rendered geometry.

27 Claims, 14 Drawing Sheets

(56) References Cited

OTHER PUBLICATIONS

U.S. Appl. No. 13/834,567, entitled "System and Method for Overlaying Two-Dimensional Map Elements over Terrain Geometry," filed Mar. 15, 2013 (45 pages).
International Search Report and Written Opinion for Application No. PCT/US2014/027713, dated Aug. 13, 2014.
International Search Report and Written Opinion for Application No. PCT/US2014/027755, dated Aug. 13, 2014.
Jung J H and O'Leary D P 2007 Implementing an interior point method for linear programs on a CPU-GPU system Electron. Trans. Number. Anal. 28 174-89.
Office Action for U.S. Appl. No. 13/843,535, issued Mar. 10, 2015.

* cited by examiner

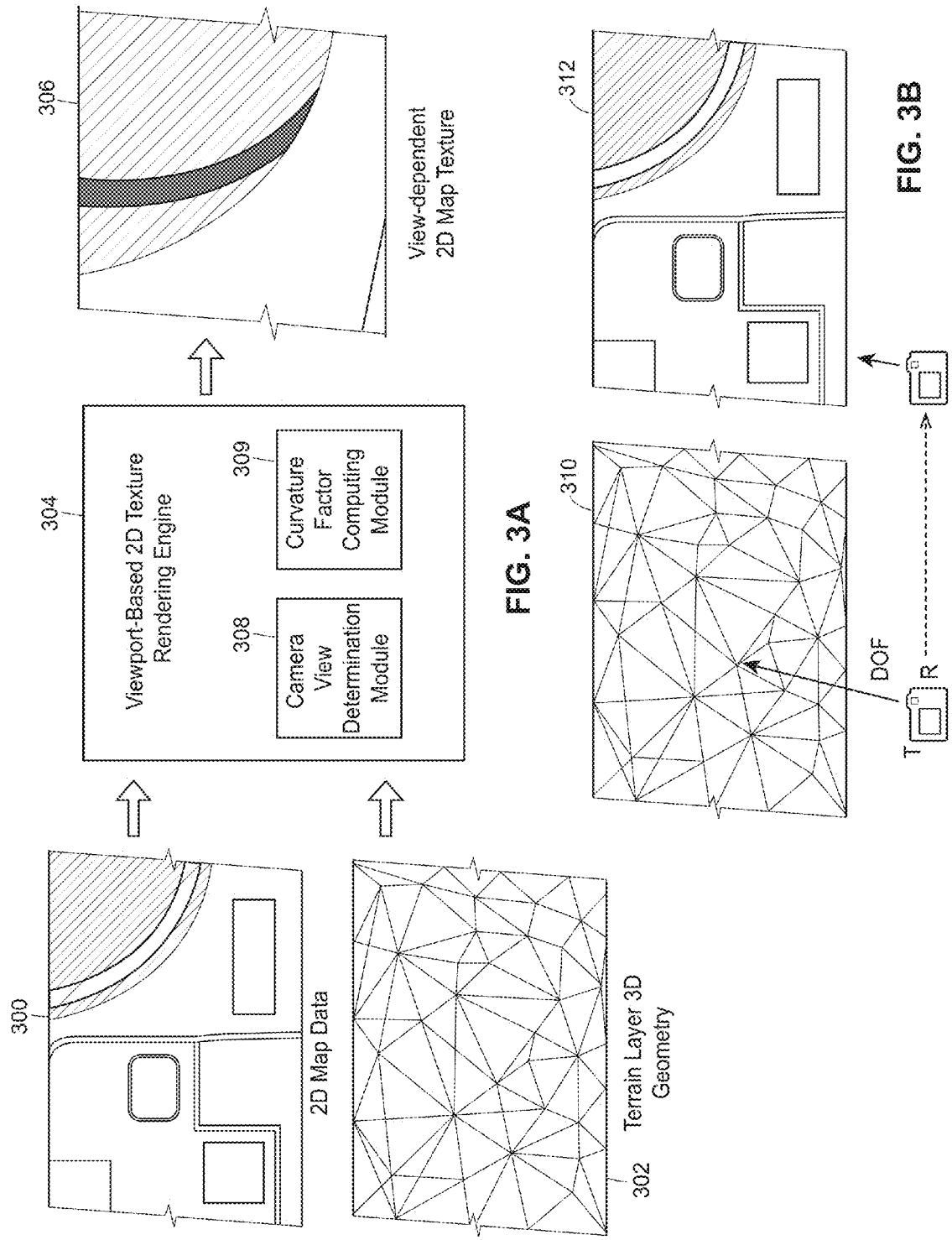

SYSTEM AND METHOD FOR OVERLAYING TWO-DIMENSIONAL MAP DATA ON A THREE-DIMENSIONAL SCENE

FIELD OF THE DISCLOSURE

The present disclosure relates to map rendering systems including electronic map display systems, and more specifically to a map rendering system in which map images are rendered using two-dimensional (2D) map data with a three-dimensional (3D) scene.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that display digital maps ("mapping applications"). Some of these mapping applications are interactive and provide users with the ability to acquire useful information such as a route to a particular destination. The route may include one or more map elements, e.g., roads or paths that are rendered from two-dimensional (2D) map data and displayed to the viewer. The 2D map data does not include elevation information and the map elements are presented in a plane format. However, the plane format does not provide the viewer with information associated with the vertical relationship of the map elements with nearby structures, vegetation, or undulating terrain.

Other computer-based mapping applications provide users with life-like interactive scenery using three-dimensional (3D) map data, which may incorporate 3D geometry of the scenery and photographs of the structures, roads, vegetation, and terrain in the scenery. The data defining 3D geometry can be a set of vertices interconnected by edges such as 3D mesh, for example. Photographs or other images are used to "texture" the 3D geometry. The 3D map data typically is defined in a 3D coordinate system rather than in a 2D coordinate system of a 2D map.

SUMMARY

A software application such as a web browser or a mapping application accurately and efficiently augments a 3D scene of a geographic area with 2D map data corresponding to the same geographic area. The 3D scene is generated using 3D map data that describes 3D geometry (e.g., a mesh) and imagery textures. 2D map data normally is used to generate a flat 2D representation of a geographic area. To apply the 2D map data to the 3D scene, the software application renders the 2D map data, or some of the selected elements of the 2D map data, to a "map texture" that can be applied to the 3D geometry. To this end, the software application determines a perspective of the virtual camera relative to the 2D map based on the position of the virtual camera in the 3D coordinate system of the 3D scene. Further, when the 3D geometry is, or can be, separated into terrain layer geometry and buildings and vegetation layer geometry, the software application can apply the map texture to the terrain layer geometry. Still further, the software application can "raise" certain map elements above the terrain layer geometry by adjusting z-offset values of the pixels in the map texture.

More particularly, in one example implementation, a method for augmenting a 3D scene with 2D map data is implemented in a computing device. The method includes receiving 3D map data that includes 3D geometry data and imagery texture data. For a specified perspective of a virtual camera in a 3D coordinate system, the method includes rendering geometry of the 3D scene using the 3D geometry data, where the specified perspective includes a position and orientation relative to the 3D scene. The method further includes generating a map texture using the 2D map data in accordance with the perspective of the virtual camera in the 3D coordinate system, and applying (i) the imagery texture and (ii) the map texture to the rendered geometry.

In accordance with yet another example implementation, a computing device includes a user interface including a display device, one or more processors, and a tangible computer-readable medium storing instructions. When executed on the one or more processors, the instructions cause the computing device to (i) receive 2D map data that specifies elements of a digital 2D map, where the 2D map data is parameterized in a coordinate system associated with projecting a spherical surface onto a flat surface, (ii) receive an indication of a perspective of a virtual camera relative to a 3D scene in a 3D coordinate system, (iii) using the 3D map data, generate a map texture for application to the 3D scene in accordance with the perspective of the virtual camera, and (iv) apply the map texture is applied to the 3D scene.

In accordance with yet another example implementation, a tangible non-transitory computer-readable medium stores instructions. When executed by one or more processors, these instructions cause the one or more processors to receive 3D map data that includes 3D geometry data and imagery texture data and, for a specified perspective of a virtual camera in a 3D coordinate system, render geometry of the 3D scene using the 3D geometry data, where the specified perspective includes a position and orientation relative to the 3D scene. The executed instructions further cause a map texture to be generated using the 2D map data in accordance with the perspective of the virtual camera in the 3D coordinate system, and cause (i) the imagery texture and (ii) the map texture to be applied to the rendered geometry.

According to yet another implementation, a computing device includes (i) a means for receiving 3D map data that includes 3D geometry data and imagery texture data, (ii) a means for rendering, for a specified perspective of a virtual camera in a 3D coordinate system, geometry of the 3D scene using the 3D geometry data, where the specified perspective includes a position and orientation relative to the 3D scene, (iii) a means for generating a map texture using the 2D map data in accordance with the perspective of the virtual camera in the 3D coordinate system, and (iv) a means for applying the imagery texture and the map texture to the rendered geometry

BRIEF DESCRIPTION OF THE DRAWINGS

FIG. 3A schematically illustrates rendering 2D map data according to a particular perspective of a virtual camera in a 3D space.

FIG. 3B schematically illustrates using terrain information to render 2D map data according to a particular perspective of a virtual camera in a 3D space.

DETAILED DESCRIPTION

Overview

Figure 1:
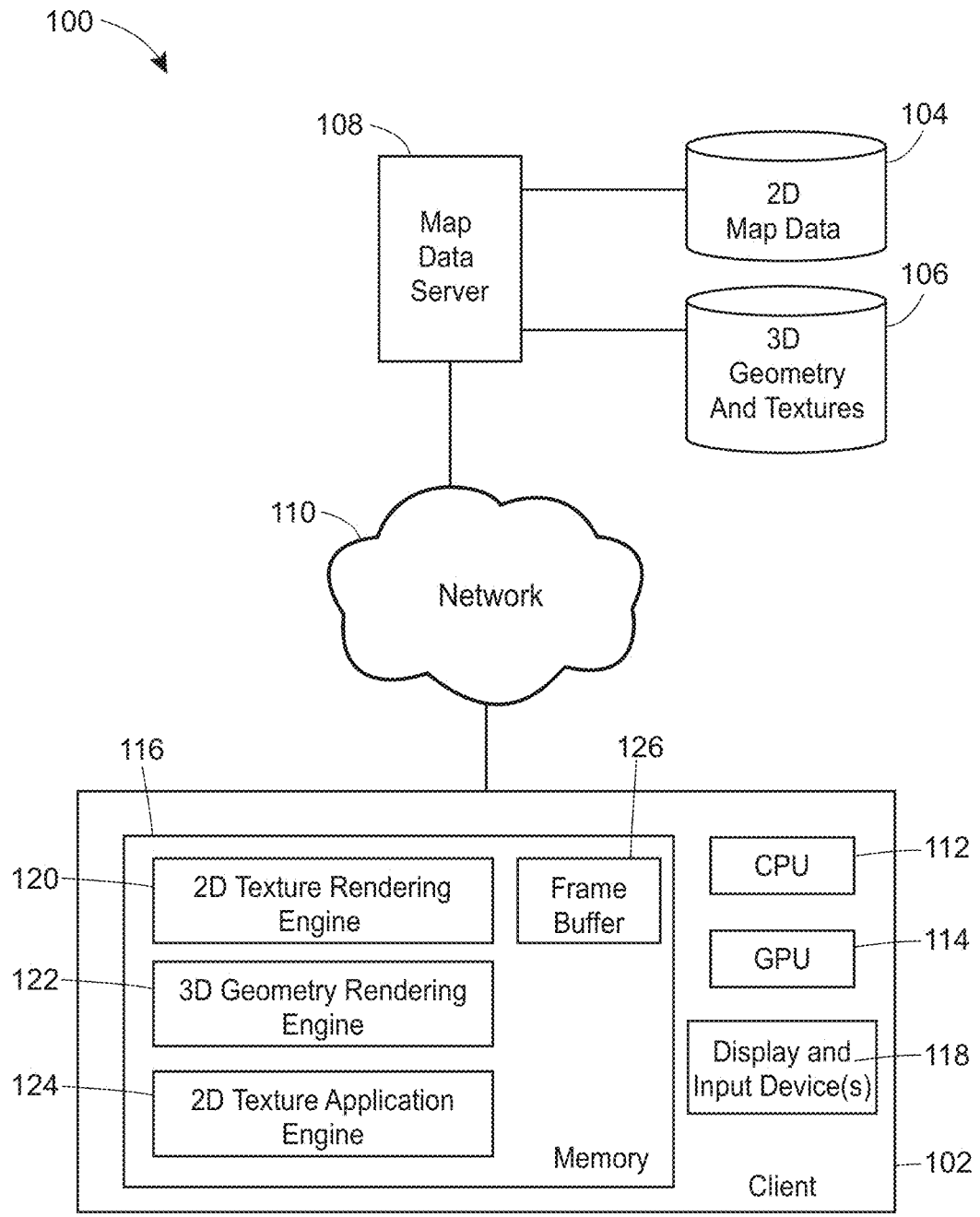
FIG. 1 is a block diagram of an image rendering system in which techniques of the present disclosure are utilized to augment a 3D scene with 2D map data.

Using the techniques of the present disclosure, a software application such as a mapping application or a web browser efficiently and accurately augments a three-dimensional (3D) scene with data used to generate a two-dimensional digital (2D) map of same geographic region. As a result, the software application can combine the immersive experience of digital 3D maps with the richness of information of digital 2D maps. For example, the software application can overlay road information provided by a 2D map on a 3D scene to display the road using different colors depending on live traffic conditions. As another example, the software application can allow the user to select and highlight the road on a 3D map via the user interface.

Digital 2D and 3D maps differ in several respects. In general, a 2D digital map displayed on a screen of a computing device provides an overhead view of a geographic region in a planar format similar to a traditional paper map. The 2D digital map is generated using data ("2D map data") that describes various map elements, such as roads, bicycle paths, pedestrian trails, buildings, parks, bodies of water, etc. Although some 2D maps may include text or topographic lines that indicate elevation, there are no altitude parameters associated with most map elements, such as roads, routes, and paths. Digital 2D maps can be parameterized in a 2D coordinate system associated with projecting a spherical surface onto a flat surface, such as Mercator or plate carrée.

On the other hand, a digital 3D map is a 3D representation of a geographic region. Digital 3D maps are generated using 3D map data that includes 3D geometry data (e.g., 3D mesh) and imagery textures. 3D geometry is parameterized in a 3D coordinate system, which can be a Cartesian system, for example. As a more specific example, digital 3D maps can be parameterized in the Earth-centered, Earth-fixed (ECED) coordinate system. For clarity, the examples below refer to Cartesian systems. Imagery texture may be created using photographs of the real environment and accordingly may provide a 3D map with a more realistic appearance than a 2D map of the same region. However, 3D geometry of individual map features, such as buildings, roads, trees, etc., typically is not easily separable from the 3D mesh. For example, a 3D mesh may define the geometry of a terrain and a road going over the terrain, but not the boundaries separating the road from the terrain. It is therefore difficult to separately select and manipulate individual map features or groups of map features.

Generating a particular view of a 3D scene can be understood as looking at the 3D scene through the viewport of a virtual (i.e., imaginary) camera position at a certain point in the coordinate system of the 3D scene, and with a certain orientation relative to the 3D scene. In addition to zooming and panning, the user can control pitch, yaw, and roll parameters of the camera. Position and orientation of a virtual camera collectively are known as a "camera pose," and also can be referred to as the "camera view" or "perspective of the camera." In some scenarios, the camera poses changes frequently (e.g., several times per second) in response to user input.

To apply 2D map data to a 3D scene, the software application in one implementation renders 2D map data in accordance with the current perspective of the virtual camera in the coordinate system of the 3D scene. To this end, the software application puts a 2D map on an imaginary 2D plane in a 3D setting, so that the 2D map can be observed by a virtual camera in a tilted and rotated perspective view. The software application may translate coordinates of the virtual camera from the coordinate system of the 3D scene to the coordinate system of the 2D map. As discussed in more detail below, this translation in at least some of the cases accounts for the curvature of the Earth. Using the determined position of the virtual camera, the software application renders 2D map to generate a texture ("map texture"), which then can be applied to 3D geometry.

When generating map textures, the software application may render some of the elements included in the 2D map data in a transparent manner while rendering other elements in a non-transparent manner. The software application can thereby select the desired map elements for application to a 3D scene. For example, the software application can render a road to a map texture while making elements surrounding the road transparent. The map texture in this scenario accordingly can be referred to as the "road texture." Other examples of map elements selected for application to a 3D scene in the form of a texture include labels, point of interest (POI) indicators, etc.

To properly apply both imagery texture and map texture to 3D geometry of a scene, the software application may obtain separate descriptions of two or more vertical layers of the 3D geometry. In particular, the 3D geometry can be separated into a terrain layer and a buildings and vegetation layer, each of which may be rendered and textured separately and independently of the other layer. The terrain layer defines the lower layer and the buildings and vegetation layer defines the upper layer of the 3D geometry. When separate definitions or the geometry of the two layers are available, the software application can render the geometry of the terrain layer as well as the geometry of the buildings and vegetation layer and apply imagery texture to both layers. Then, the software application can re-render the geometry of the terrain layer and apply the map texture to the re-rendered geometry.

Further, the software application in some cases may apply map textures and imagery textures to 3D geometry so as to drape a map element such as a road, a railroad track, a bicycle or pedestrian path, etc. over the terrain layer as well as low vegetation (where necessary) but not buildings or tall trees. To this end, the software application may apply a small elevation (or "depth") offset to the map texture corresponding to certain map elements. The depth offset can be implemented using z-offset values. According to one such implementation, an offset of about 30 meters in the world space is automatically translated into the z-offset for the particular 3D scene.

An exemplary system and several exemplary techniques for integrating 2D map data with a 3D scene are discussed in more detail below with reference to FIGS. 1-8B.

Example System Architecture

FIG. 1 depicts one exemplary embodiment of an image rendering system 100 in which a 3D scene can be augmented by 2D map data. A client device 102 is coupled to a 2D map data database 104 and a 3D geometry and textures database 106 via a map data server 108. Although the databases 104 and 106 are separate in the system 100, 2D map data and 3D map data (made up of 3D geometry and textures) in general can be stored in one or several separate databases. The 2D map data and the 3D map data may be provided to the databases 104 and 106 by the same or different sources, providers, individual users, etc.

According to some implementations, 2D map data in the database 104 describes shapes, line thickness, fill colors, text labels, and other attributes of map elements. For example, the map elements may be generated in a vector graphics format that specifies various geometric shapes (e.g., using mathematical descriptions of points and paths connecting the points) and indicates how the geometric shapes should be positioned for rendering the various map elements. Thus, rather than specifying each pixel that makes up a raster image of a line segment, a vector-based description of the line segment may specify the two endpoints of the line segment and indicate that the two endpoints are connected by a straight line. Vector-based descriptions of map elements may be referred to in this document as vector descriptors or simply vectors, and a set of one or several vector descriptors may be referred to as vector data or 2D map data.

In some instances, 3D map data in the database 106 may be generated using automated techniques such as scanning or synthesis (e.g., using structure from motion (SFM) or another suitable 3D geometry reconstruction technique) and/or manual modeling. As discussed above, 3D map data includes 3D geometry and textures that can be applied to the 3D geometry.

A map data server 108 is coupled to the databases 104, 106 and a network 110. The network 110 may be a wide area network (WAN) such as the Internet, a local area network (LAN), or any other suitable type of network. To provide map and feature data to the client device 102, the map data server 108 may generate electronic messages including map data and transmit these messages via the network 110. In other implementations, the databases 104 and 106 are coupled to different respective servers (which may be operated by different providers of map data).

The client device 102 may be coupled to the network 110 via a wired or wireless communication protocol. The client device 102 can include one or more central processing units (CPUs) 112, one or more graphics cards or graphics processing units (GPUs) 114 dedicated to efficiently rendering images, and a memory 116, which may include volatile (e.g., RAM) and/or nonvolatile (e.g., flash) components. The CPU 112 and/or GPU 114 are configured to execute instructions of various software applications and modules stored in the memory 116.

More specifically, the memory 116 stores a 2D texture rendering engine 120, a 3D geometry rendering engine 122, a 2D texture application engine 124, each of which can be made up of instructions in one or several programming languages. Depending on the implementation, the instructions of the software components 120-124 can be compiled for execution directly on the CPU 112 or interpretable at runtime by another software application such as a web browser or a dedicated mapping application (neither shown). Further, in some implementations, some or all of the components 120-124 include graphics programs called "shaders." For example, shaders can operate in an Open Graphics Library (OpenGL) pipeline and can directly access the GPU 114 to utilize its large computational power to achieve visually rich rendering with interactive performance. In particular, "vertex shaders" generally operate on vertices in two- or three-dimensional space, while "fragment shaders" operate on individual pixels. A vertex shader can specify how vertices of a triangle stored in a buffer should be transformed to render the triangle in a particular way depending on the perspective, rotation, etc. A fragment shader can then generate pixels of appropriate color inside the triangle. In addition to OpenGL, shaders can operate in other graphics frameworks such as Direct3D, for example. Moreover, in some systems, shaders can run entirely on the CPU.

In operation, the 2D texture rendering engine 120 generates textures for application to 3D geometry using 2D map data and in accordance with the perspective of a virtual camera in the coordinate system of the 3D geometry. In other words, the 2D texture rendering engine 120 renders a 2D map on a flat plane as observed by a 3D virtual camera, i.e., a virtual camera whose position and orientation is defined in a 3D coordinate system. Example techniques which the 2D texture rendering engine 120 can implement are discussed below with reference to FIGS. 3A, 3B, 6A, and 6B for example. The 3D geometry rendering engine 122 renders 3D geometry organized into one or multiple layers, as discussed in more detail with reference to FIGS. 2A and 2B. The 2D texture application engine 124 applies the textures generated by the engine 120 (as well as imagery textures provided as part of the 3D map data) to the geometry generated by the engine 122, as discussed with reference to FIGS. 4A-C, 7A-C, and 8A-B.

When executed on by the CPU 112 and/or GPU 114, software components output graphical content via a user interface that includes one or more display screens and/or input devices 118. The devices 118 can include one or more of a screen, a touchscreen, a keyboard, a mouse, etc.

With continued reference to FIG. 1, the memory 116 also stores a frame buffer 126 for off-screen rendering. According to some implementations, the components 120-124 first render 2D map elements to the frame buffer 126, and then copy the pixels to a texture.

For simplicity, only one instance of the map data server 108, the client device 102, and the 2D and 3D map databases 104, 106 are illustrated in FIG. 1. However, in other embodiments, the system 100 may include more than one map server 108, more than one client device 102, more than one 2D map database 104, and/or more than one 3D map database 106. Further, in some embodiments, the map data server 108 provides map data to one or more various client devices 102 including, portable computing devices, tablet computing devices, smartphones, desktop computing devices, etc.

Two-layer Representation of Geometry of a 3D Scene

Figure 2A:
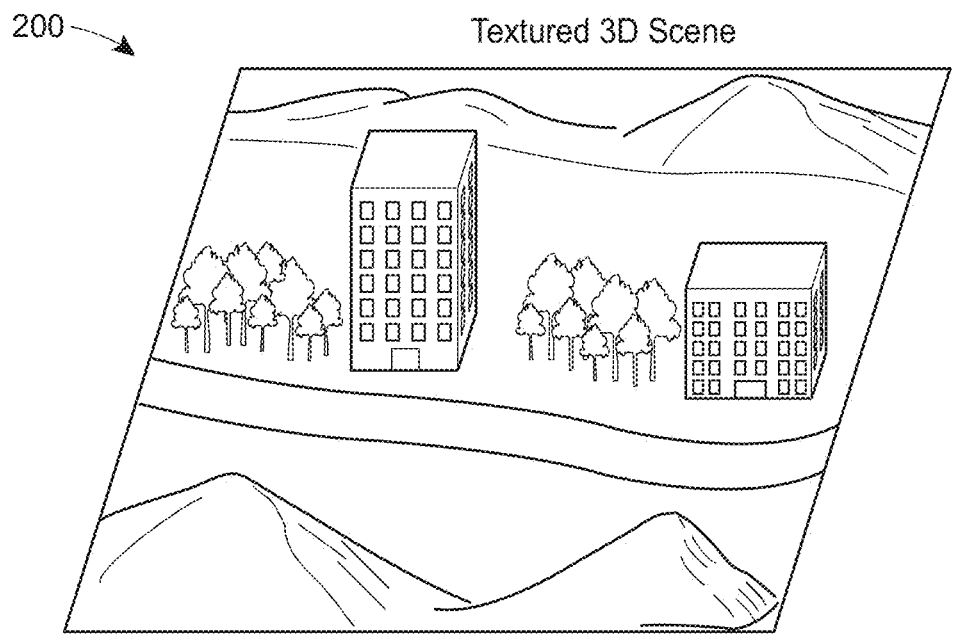
FIG. 2A illustrates an example textured 3D scene.

FIG. 2A illustrates a 3D scene 200 generated using 3D map data, which includes a 3D geometry and a imagery texture. The 3D scene 200 depicts various real-world objects such roads, buildings, trees, etc. and terrain features such as hills. However, the 3D map data exists in one vast geometry, and individual objects are not easily identifiable, selectable, or separable from the single geometry.

While it is possible to apply a map texture (generated using 2D map data) to the single geometry of the 3D scene 200, the resulting scene will not always properly reflect the physical reality. For example, a road may appear to drape over a tall building. To avoid such results, the geometry of the 3D scene 200 can be separated into two layers, terrain layer geometry and buildings and layer geometry, and the map texture can be applied to only the terrain layer.

Figure 2B:
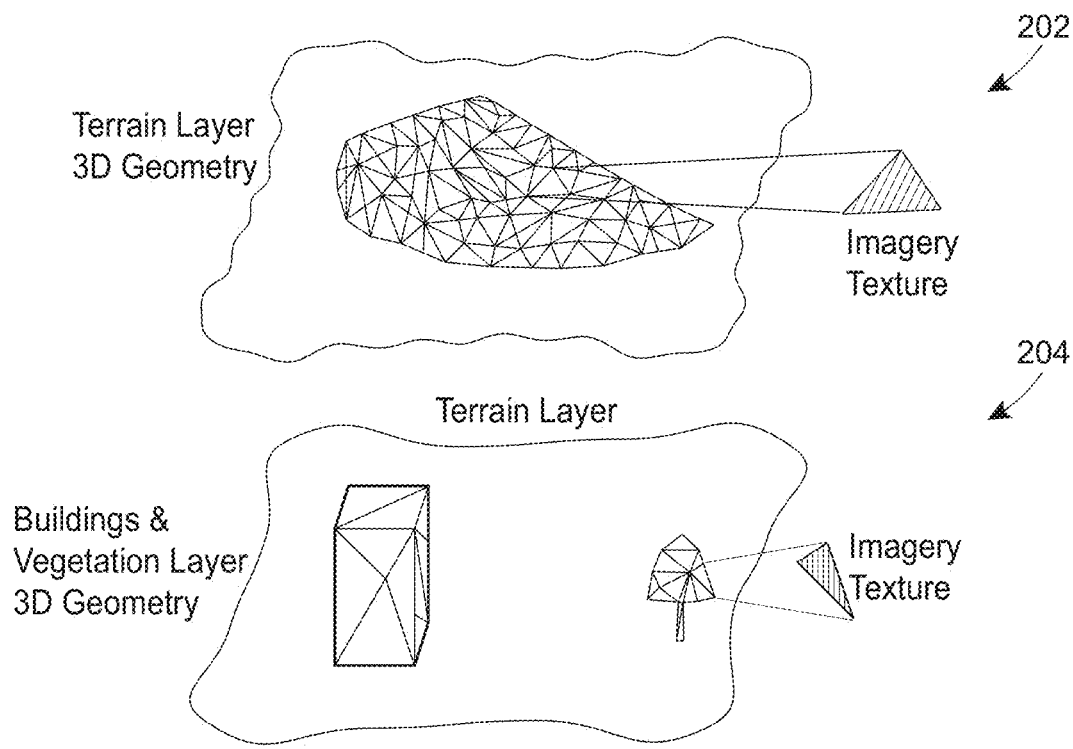
FIG. 2B illustrates an example 3D geometry organized into two textured layers.

FIG. 2B illustrates example fragments of two layers of 3D geometry that may be derived from the single layer 3D geometry of FIG. 2A using any suitable techniques, including those known in the art. Together, a terrain layer 3D geometry 202 and a buildings and vegetation layer 3D geometry 204 make up the geometry of the 3D scene 200. The terrain layer 3D geometry 202 describes the surface of a geographic region. The buildings and vegetation layer 3D geometry 204 specifies the shapes of buildings, bridges, overpasses, and other structures, as well as trees, bushes, and other vegetation. Each of the layer 3D geometries 202 and 204 may be textured with the imagery texture. The imagery texture may be photographic, for example.

Referring back to FIG. 1, rendering 3D geometry of component layers as schematically illustrated in FIG. 2B can be implemented in the 3D geometry rendering engine 122, for example.

Figure 2C:
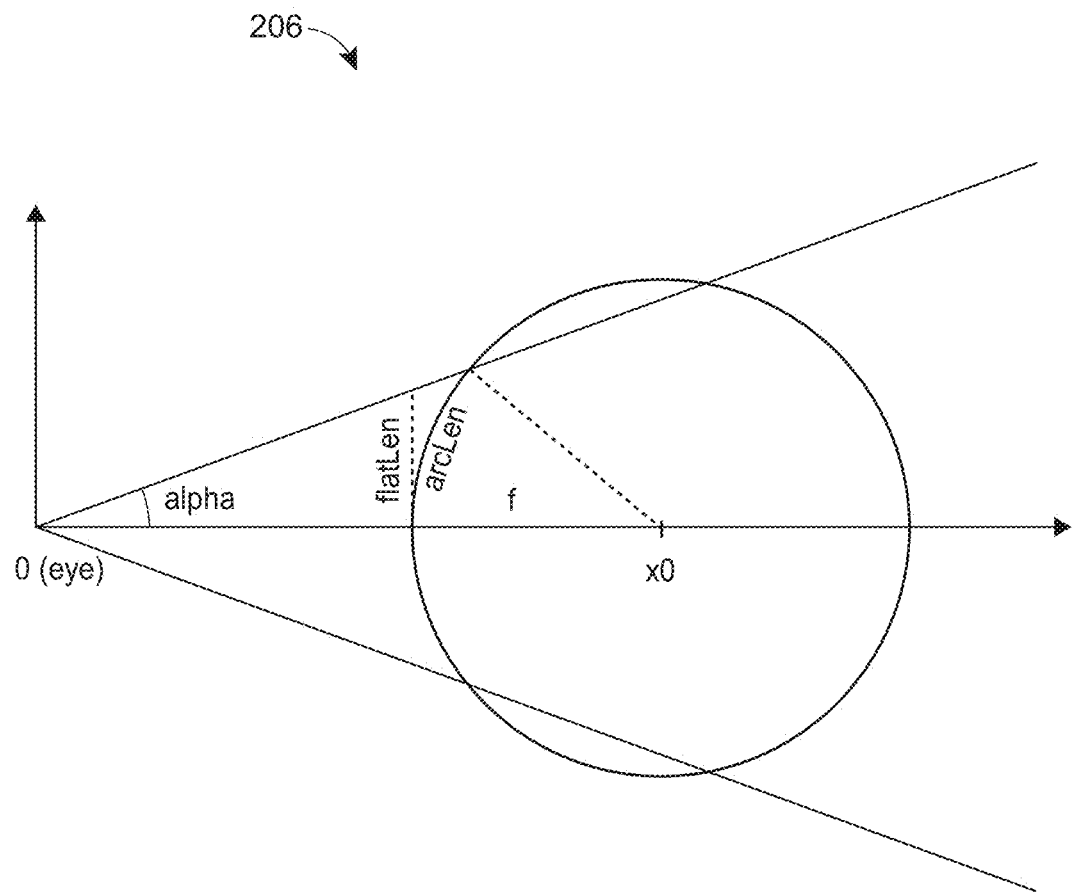
FIG. 2C illustrates a curvature factor that may be considered when rendering images from a camera position at a higher altitude.
Figure 2D:
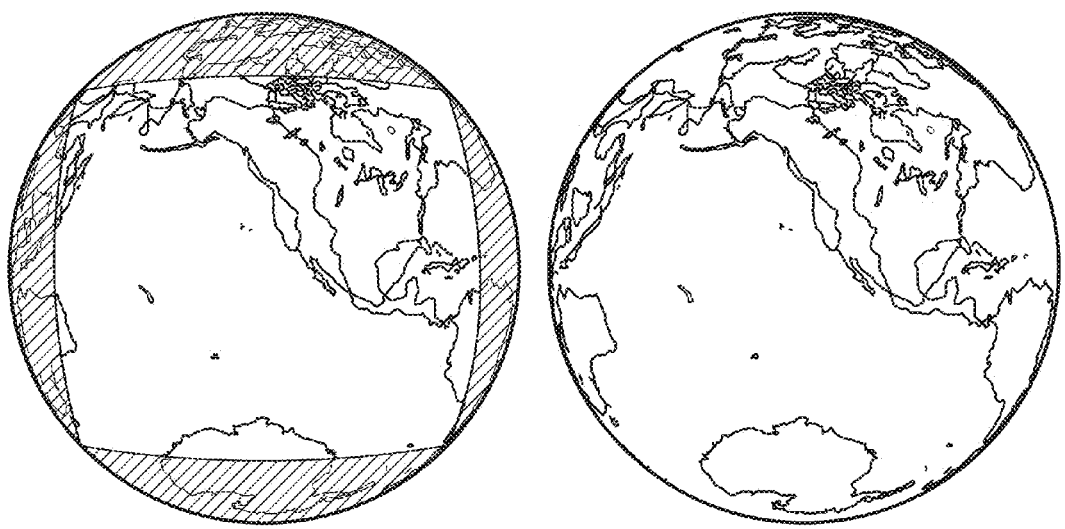
FIG. 2D illustrates an example rendering of a large geographic area before considering the curvature of the Earth (left) and after considering the curvature of the Earth (right).

Determining Position of the Virtual Camera Relative to 2D Map Data when Generating Map Textures Generally speaking, augmenting the 3D scene of FIG. 2A with 2D map data, in particular 2D map elements such as roads and/or routes, requires that the 2D map data conform to the 3D geometry of the 3D scene 200. However, as discussed above, 2D map data and 3D map data have different parameterization, reside in different coordinate systems, etc. Further, simply setting a virtual camera above a flat 2D map at the same altitude as the virtual camera in the coordinate system of the 3D scene does not provide the desirable result. As illustrated in FIG. 2C, curvature of the Earth makes viewable surface (see arcLen) larger than if the Earth were flat (see flatLen), especially at higher altitudes of the virtual camera (at the location marked eye). For further clarity, the image on the left in FIG. 2D illustrates a limited view generated when the 2D texture rendering engine 120 or a similar module does not account for the curvature of the Earth, and the image on the right in FIG. 2D illustrates the result when the engine 120 accounts for the curvature of the Earth.

Now referring to FIG. 3A, the engine 120 of FIG. 1 can be implemented as a 2D texture rendering engine 304, for example. In operation, the engine 304 receives 2D map data 300 and terrain layer 3D geometry 302 and generates view-dependent 2D map texture 306, which is similar to imagery textures applied to 3D geometry. The engine 304 can include several components such as, for example, a camera view determination module 308 that determines the position of a virtual camera relative to a 2D map, a curvature factor computing module 309 that generates corrections to the map texture 306, etc.

According to an example implementation, the camera view determination module 308 determines the following parameters of the virtual camera positioned relative to a 2D map corresponding to the 2D map data 300 (i) a target point determined in the coordinate system of the 2D map data 300 (e.g., Mercator), (ii) target distance to the 2D map as calculated in the coordinate system of the 2D map data 300, (iii) tilt, and (iv) rotation. FIG. 3B illustrates the determination of these parameters in more detail. For clarity, the example implementation of FIGS. 3A and 3B is discussed with reference to Mercator and Cartesian coordinate systems.

The camera view determination module 308 determines the target point as the intersection of the direction of flight (DOF) vector and the terrain surface layer 3D geometry 302 using ray casting, for example. It is noted that the camera view determination module 308 accounts only for terrain layer 3D geometry (or mesh) 310 while ignoring buildings and vegetations that the corresponding 3D scene also may include. In this manner, the camera view determination module 308 determines such a position and orientation of the virtual camera that allows a map texture 312 to be relatively smooth (because the map texture 312 is then draped over the terrain but not the buildings, as discussed below).

To determine the target distance, camera view determination module 308 transforms the Cartesian coordinates of the virtual camera in the space of the 3D scene into Mercator coordinates. The camera view determination module 308 then computes the distance between the transformed camera position and the target point of the 2D map. This computation generally provides an acceptable match between Cartesian and Mercator space. However, when the virtual camera is at high altitude, a technique that does not account for the curvature of the Earth yields margins with no map textures (see FIG. 2D, the image on the left). Accordingly, the curvature factor computing module 309 generates an appropriate curvature factor. In some implementations, the curvature factor computing module 309 generates a curvature factor only at certain altitudes of the virtual camera, as discussed in more detail below.

Further, to generate tilt parameters T, the camera view determination module 308 can use the camera matrix defined in the Cartesian space of the virtual camera. If this matrix conforms to the canonical camera model, the view determination module 308 can directly adopt the tilt values from the canonical model.

Similarly, the view determination module 308 can adopt rotation parameters R from the canonical camera model.

Applying a Curvature Correction Factor to Map Textures

Referring to FIGS. 2C and 3A, the curvature factor computing module 309 can determine a curvature correction factor, which the camera view determination module 308 may multiply by the target distance parameter when determining a view of the virtual camera for use with the 2D map data 300. The modules 308 and 309 thus can expose a larger area when the curvature of the Earth becomes a factor at higher altitudes.

The curvature factor computing module 309 can derive the curvature correction factor by assuming an ideal setting where the view frustum faces straight toward the center of the Earth. The diagram 206 in FIG. 2C depicts some of the parameters the curvature factor computing module 309 determines when rendering an image at higher elevations. The origin is set at the eye (O) and the center of the earth is $x_0$. The angle alpha ($\alpha$) is given by:

$$\alpha = \sqrt{2}\,\frac{f_{ovy}}{2}, \qquad \text{(Eq. 1)}$$

where $f_{ovy}$ is a field of view along the half-diagonal of the view frustum, assuming the view frustum is square. The radius of the Earth is r.

The curvature correction factor CCF is given by:

$$CCF = \frac{arcLen}{flatLen} \qquad \text{(Eq. 2)}$$

Further, flatLen can be computed using trigonometry:

$$\text{flatLen} = (x_0 - r)\tan(\alpha) \qquad \text{(Eq. 3)}$$

The curvature factor computing module 309 determines arcLen using the ideal view frustum. First, the curvature factor computing module 309 can determine point x that is intersection point between the sphere and the line:

$$x = x_o \pm \frac{\sqrt{(k^2\,r^2 - k^2 x_o^2 + r^2)}}{k^2 + 1} \qquad \text{(Eq. 4)}$$

Then, the curvature factor computing module 309 can determine arcLen as follows, using the closer one of the two intersections:

$$arcLen = r\cos^{-1}\left(\frac{x_0 - x}{r}\right) \qquad \text{(Eq. 5)}$$

Thus, the curvature factor computing module 309 can compute flatLen using Eq. 3, arcLen using Eq. 5, and CCF using Eq. 1.

Rendering 3D Geometry with Map Textures

Referring back to FIG. 1, the 2D texture application engine 124 can apply a map texture, such as map texture 306 or 312 of FIG. 3B, to 3D geometry. The 2D texture application engine 124 can include a fragment shader that look up pixels from the map texture and blends these pixels on top of the texture of the 3D geometry 200. In a typical scenario, the map texture includes pixels of the desired map elements such as roads in a non-transparent format, and other map elements or background colors in a transparent format. In other words, the 2D texture application engine 124 effectively blends only these map elements on top the texture of the 3D geometry 200. Efficient techniques for apply both map textures and imagery textures to 3D geometry are discussed in more detail below.

To texture a 3D geometry with map textures generated using 2D map data, the 2D texture application engine 124 transforms 2D map data from a 3D coordinate system to a 2D coordinate system, e.g., from Mercator to Cartesian. Alternatively, the 3D geometry may be transformed from Cartesian to Mercator. The transformation between the coordinate systems is non-linear and involves more that a single matrix multiplication. Moreover, the source and destination spaces have highly dynamic ranges (because they span the entire globe) and accordingly require double precision calculations. However, only some of the currently available GPUs support this functionality.

According to one implementation, the 2D texture application engine 124 implements two less complex transformations, one for camera views at higher altitudes and another one for camera views as lower altitudes.

For close-by camera views at lower altitudes, where precision is an important concern, the observable surface area of the Earth is reasonably small. Therefore, at closer views, the 2D texture application engine 124 can approximate transformation from Cartesian to Mercator (or in the opposite direction, if desired) with a linear transform. 3D map data in some implementations is organized into an octree, i.e., a data structure in which a node representing a unit of space has eight children, each representing a one-eighth of that unit of space. This approximation allows for the matrices to be concatenated from the local model space from each octree node to the space of the map texture. The concatenation of matrices may be done in the CPU in double precision, and the resulting matrix may be stored in memory. Because the transformation is between two low dynamic range spaces, the 2D texture application engine 124 may store the resulting matrix in single precision and use this matrix in the shaders in the GPU.

For far-away camera views at high altitudes, the 2D texture application engine 124 does not use linear approximation because the curvature of the Earth has a significant effect on the transformation. However, because the view is farther away, precision is not as critical, and so the 2D texture application engine 124 may perform a full non-linear transformation from Cartesian to Mercator (and subsequent map texture) in a vertex or fragment shader.

In an example implementation, the 2D texture application engine 124 switches between the close-by camera view mode and the far-away camera view mode approximately at 15 Km above the sea level.

As part of constructing the linear transformation from an octree node to texture space, the 2D texture application engine 124 may construct a local (first-order) approximation of matrix matrixMercatorFromCartesian. This matrix can be a function of location, $pivot_{Cartesian}$, that corresponds to the point (e.g., altitude) at which the linear transformation will be accurate. The error will likely increase as the view gets farther away from point $pivot_{Cartesian}$. Matrix matrixMercatorFromCartesian can be used to transform coordinates that are reasonably close to the point represented by $pivot_{Cartesian}$. To build this approximation, $pivot_{Mercator}$ (corresponding to $pivot_{Cartesian}$) is computed first. This is a non-linear transform that requires double precision, which may be easily determined in JavaScript, for example.

The 2D texture application engine 124 may generate matrix T to subtract pivot from the Cartesian coordinates. A second matrix, R, can be built to account for rotation. The upper left 3×3 part of matrix R will be the Jacobian matrix: $J_{Cartesian \to Mercator}(x, y, z)$. This requires computing the partial derivatives of the Mercator components with respect to each Cartesian dimension, either analytically or by finite differencing. Another matrix, M, is then generated to translate with the pivot offset in Mercator space. The full matrixMercatorFromCartesian is then given by:

$$\text{matrixMercatorFromCartesian} = M * R * T \qquad \text{(Eq. 6)}$$

The 2D texture application engine 124 also may construct matrix matrixScreenFromMercator to encodes the full Cartesian viewing pipeline including translation, rotation, tilt and projection. In the implementation where a map texture is generated to overlay roads on a 3D scene, this matrix can be called matrixRoadTextureFromMercator. Assuming that 3D geometry is stored in a spatial data structure organized as an octree (having properties discussed above), and further assuming matrix matrixCartesianFromCartesianOctreeNode is known, the 2D texture application engine 124 can compute the full matrix matrixRoadTextureFromCartesianOctreeNode, for use in efficiently looking up map textures from 2D map data, as follows:

matrixRoadTextureFromCartesianOctreeNode=
matrixRoadTextureFromMercator*matrixMercatorFrom
Cartesian*matrixCartesianFromCartesianOctreeNode   (Eq. 7)

This matrix transforms directly from low dynamic range space to another space. Thus, this matrix can be converted into a single precision matrix and stored in the GPU 114. During operation, the components 120-124 can use this matrix to quickly and efficiently transform vertex data with a single-precision matrix multiplication.

Moreover, the use of matrixRoadTextureFromCartesianOctreeNode allows the components 120-124 to correctly apply map textures to 3D geometry for arbitrary views of the virtual camera in the coordinate system of a 2D map, even when the 2D map view does not exactly match the 3D map view.

It is further noted that in some implementations, the components 120-124 may cache a viewport-specific map texture generated as described above. When the perspective of the virtual camera changes, the components 120-124 sometimes may reuse the map texture. For example, if the changes to the perspective of the virtual camera are relatively small, the components 120-124 may re-render 3D geometry every time, but regenerate the map texture only for every Nth change while reusing the cached map texture for the other N−1 instances. In this matter, the components 120-124 can increase the speed of generating a 3D scene textured with imagery textures and map textures at the expense of some accuracy Techniques for Applying 2D Map Textures as Well as Imagery Textures to 3D Geometry Several example techniques for applying imagery texture along with map texture to 3D geometry are discussed next. These techniques can be implemented in computing devices such as the client device 102, for example. As a more specific example, the techniques illustrated in FIGS. 4A-C and 7A-C can be implemented in the 2D texture application engine 124. These techniques may be implemented partially in JavaScript and partially in shader programs that conform to the OpenGL standard, for example. More generally, these techniques may be implemented using instructions in any one or several suitable programming languages and stored on a tangible, non-transitory computer-readable medium (such as flash memory) and are executable on one or several processors and/or graphics cards. If desired, it is also possible to implement at least some of these methods in a distributed manner using several computers, e.g., in a cloud computing environment.

Figure 4A:
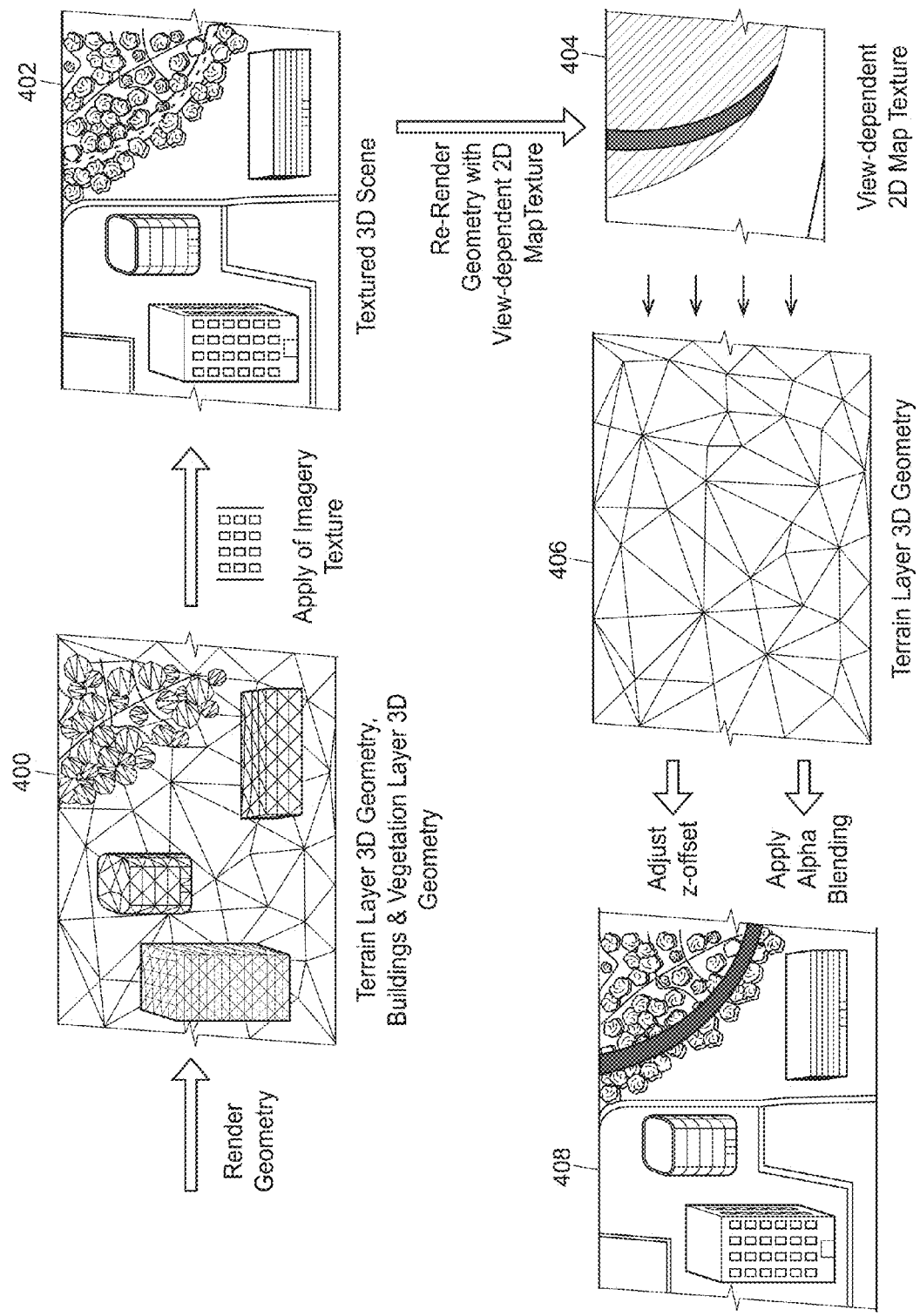
FIG. 4A schematically illustrates a technique for augmenting a 3D scene with 2D map information, according to which terrain layer 3D geometry and buildings and vegetation layer 3D geometry are rendered with their respective imagery textures, and the terrain layer 3D geometry is rendered again with view-dependent 2D map texture.
Figure 4B:
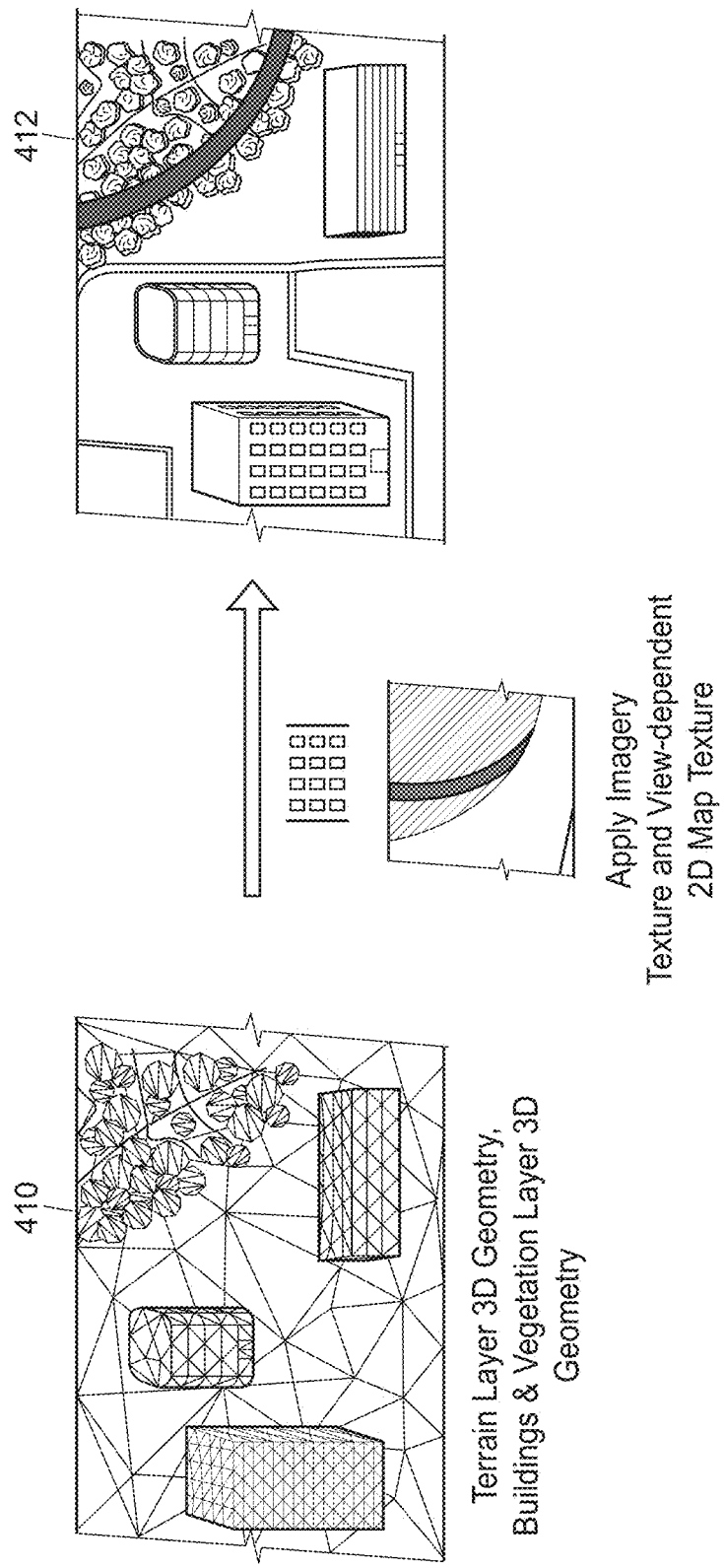
FIG. 4B schematically illustrates another technique for augmenting a 3D scene with 2D map information, according to which imagery texture and view-dependent 2D map texture are applied to a 3D mesh including a terrain layer 3D geometry and a buildings and vegetation layer 3D geometry.
Figure 4C:
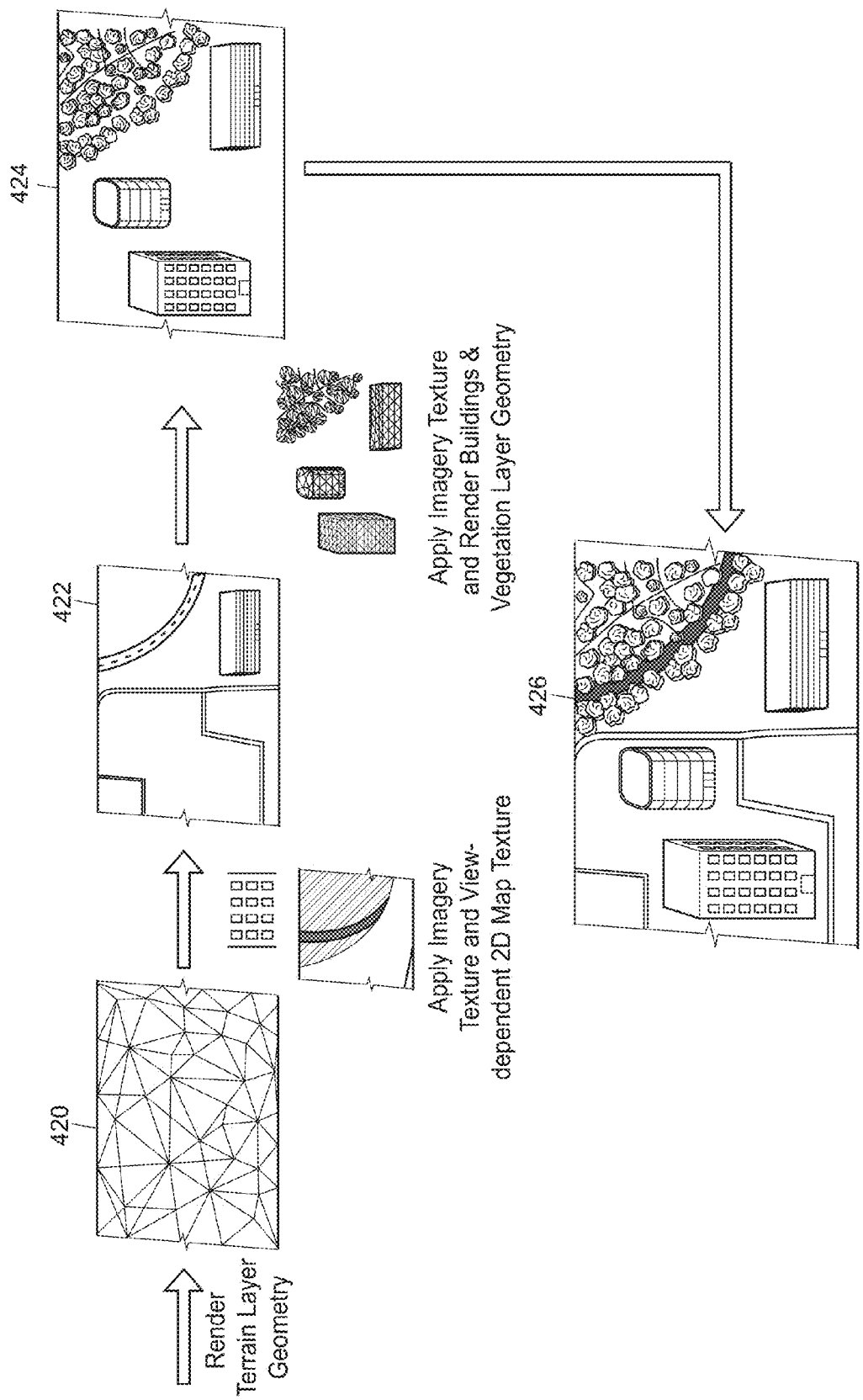
FIG. 4C schematically illustrates another technique for augmenting a 3D scene with 2D map information, according to which terrain imagery texture and view-dependent 2D map texture are applied to a terrain layer 3D geometry, and a buildings and vegetation imagery texture is applied to a buildings and vegetation layer 3D geometry.

Referring now to FIGS. 4A-4C, several different approaches for augmenting a 3D scene with 2D map data are visually depicted as sequences of frames. FIG. 4A illustrates an exemplary technique according to which both terrain layer 3D geometry and a buildings and vegetation layer 3D geometry of the 3D scene are rendered first, as schematically illustrated in frame 400. Next, imagery texture is applied to the 3D geometries of the terrain layer and the buildings and vegetation layer to attain a textured 3D scene (frame 402). It is noted that in frame 402, the road that passes through the forested area is partially obscured by the trees, as is likely the case in the physical world which the 3D scene represents.

A view-dependent 2D map texture is generated using the techniques discussed above (frame 404). It is noted that, although the map texture in frame 404 includes elements in addition to the road depicted in dark shade, some map elements can be made transparent using alpha blending or another suitable technique. For example, all parts of the map texture but the road may be transparent.

Next, terrain layer 3D geometry (frame 406) is re-rendered with the view-dependent 2D map texture to generate an augmented 3D scene illustrated in frame 408 is generated. As discussed in more detail below, when the 2D map texture includes a non-transparent road, a certain z-offset value is used to bring the road above some of the lower vegetation but keep the road below tall buildings, trees, etc. Because the vegetation in the 3D scene of FIG. 4A is low, the road in frame 408 overlays the vegetation.

Another exemplary technique for augmenting a 3D scene with 2D map data is depicted as a sequence of frames in FIG. 4B. Here, imagery texture and view-dependent 2D map texture are applied to terrain layer 3D geometry and the buildings and vegetation layer 3D geometry (frame 410) in the same pass. In the resulting 3D scene (frame 412), the road shown in dark shade occludes buildings and the vegetation layer regardless of the height of the buildings or trees.

Yet another technique for augmenting a 3D scene with 2D map data is depicted as a sequence of frames in FIG. 4C. Terrain layer 3D geometry is rendered (frame 420), and imagery texture along map texture are applied to the terrain layer 3D geometry. The resulting image includes 2D map elements atop a textured terrain layer (frame 422). Imagery texture is then applied to a buildings and vegetation layer 3D geometry to generate a textured buildings and vegetation layer (frame 424). The rendered terrain layer (frame 422) and rendered buildings and vegetation layer (frame 424) may then be integrated to attain the augmented 3D scene (frame 426). According to this technique, however, the textured buildings and vegetation layer occludes the road depicted in dark shade, as can be seen in frame 426.

Applying a Depth Offset to Map Texture

In an example embodiment of the client device 102, the 2D texture application 124 determines and applies a z-offset value such that map elements such as roads are rendered on top of overpasses and trees but are still be occluded by most taller structures. The z-offset value may be empirically determined and/or dependent upon the geographic region, e.g., city, rural area, etc. For example, the value of the z-offset may be selected in view of the average height of nearby structures, e.g., 50 m. Alternatively, data from an Earth observing system (EOS) may be utilized to select the altitude or depth of the z-offset for implementation with a vertex shader of the image rendering system 100. To implement the offset, the z values generated by the vertex shader may be displaced by a suitable amount.

According to some implementations, the 2D texture application 124 applies the z-offset value in clip space in order to not displace the screen space location of the vertices. As is known, vertices in clip coordinates have a fourth parameter, w. To determine the z-offset value in clip space given a desired eye space offset, the derivation technique described below can be used.

The derivative of the eye space z with respect to the z-buffer value can be assumed to be given by:

$$\partial z_{eb} = \frac{\partial z_{eye}}{\partial z_{buf}} \quad \text{(Eq. 8)}$$

The desired offset in the z-buffer value can then be estimated as $$z_{buffer\_offset} = \frac{z_{eye\_offset}}{\partial z_{eb}} \quad \text{(Eq. 9)}$$

Next, $z_{clip\_offset}$ that achieves this result can be solved by:

$$\frac{z_{clip} + z_{clip\_offset}}{w_{clip}} = \frac{z_{clip}}{w_{clip}} + z_{buffer\_offset} \quad \text{(Eq. 10)}$$

$$z_{clip} + z_{clip\_offset} = z_{clip} + z_{buffer\_offset} w_{clip}$$

$$z_{clip\_offset} = z_{buffer\_offset} w_{clip}$$

Thus, $$z_{clip\_offset} = z_{eye\_offset} \frac{\partial z_{eye}}{\partial z_{buf}} w_{clip}$$

Next, the derivative $\partial z_{eb}$ is computed. The projection matrix clipFromEye has only three elements that are relevant for this computation:

$$clipFromEye = \begin{bmatrix} * & * & * & * \\ * & * & * & * \\ 0 & 0 & C & D \\ 0 & 0 & G & 0 \end{bmatrix} \quad \text{(Eq. 11)}$$

Given that $$z_{buf} = \frac{z_{clip}}{w_{clip}} \text{ and } w_{clip} = 1, \quad \text{(Eq. 12)}$$

$$z_{buf} = \frac{C z_{eye} D}{G z_{eye}} \quad \text{(Eq. 13)}$$

Solving for $z_{eye}$ yields $$z_{eye} = \frac{-D z_{buf} H}{C - z_{buf} G} \quad \text{(Eq. 14)}$$

and $$\partial z_{eb} = \frac{\partial z_{eye}}{\partial z_{buf}} = \frac{-GD}{(C - G z_{buf})^2} \quad \text{(Eq. 15)}$$

To implement the map texture (or, in this case, road texture) overlay techniques of the present disclosure, Equations 10, 12, and 15 can be implemented directly in a vertex shader operating as a component of the 2D texture application 124.

Further Illustrations

For further clarity, flow diagrams of several example methods that can be implemented in the system 100 are discussed next.

Figure 5:
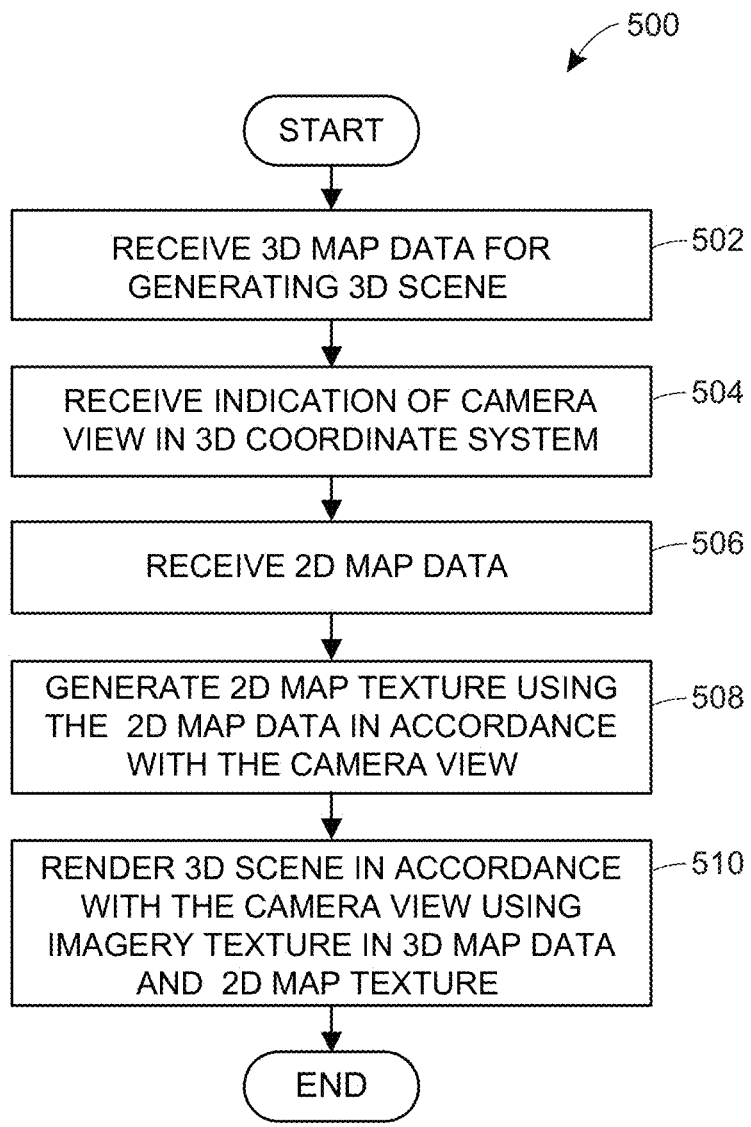
FIG. 5 is a flow diagram of an example method for augmenting a 3D scene with 2D map data that may operate in the system of FIG. 1.

FIG. 5 is a flow diagram of an example method 500 for augmenting a 3D scene with 2D map data, which can be implemented in components 120-124 and executed by the CPU 112 and partially by the GPU 114, for example. More generally, the method 500 can be implemented as a set of instructions stored in a computer-readable memory and executable on one or more processors, and can operate in any suitable client (consumer) device or, if desired, a network server.

At block 502, digital 3D map data for generating a 3D scene is received at the system. The received data can include 3D geometry data and imagery texture data. The 3D geometry data may include mesh data that specifies a plurality of interconnected vertices. In some cases, the 3D geometry data may include separate, independently interpretable terrain layer geometry data and buildings and vegetation layer geometry data.

An indication of a view of the virtual camera in a 3D coordinate system (3D camera view) is received at the system (block 504). As discussed above, the 3D camera view corresponds to a certain perspective including a position and orientation in the 3D coordinate system.

Next, at block 506, 2D map data is received. The 2D map data may be parameterized in a coordinate system associated with projecting a spherical surface onto a flat surface, such as Mercator or plate carrée. The 2D map data may include vector-based 2D geometry data.

The 2D map data is used to generate a 2D map texture in accordance with the 3D camera view (block 508). Generating the map texture may include rendering map elements included in the 2D map data into a texture and rendering areas free of map elements into transparent fragments of the texture. In some implementations, generating the map texture also includes rendering the 2D map data to a frame buffer of a graphics pipeline and subsequently copying the frame buffer into a texture. Generating the map texture also may include rendering map elements of a certain type included in the 2D map data into the texture and rendering map elements of another type (or all other types) into transparent areas of the texture, as discussed with reference to FIG. 8B. The type of map elements that is rendered non-transparently can include roads, labels, and point of interest (POI) indicators, depending on the scenario.

At block 510, a 3D scene in accordance with the 3D camera view, and using both the map texture and imagery textures. The method completes after block 510.

Figure 6A:
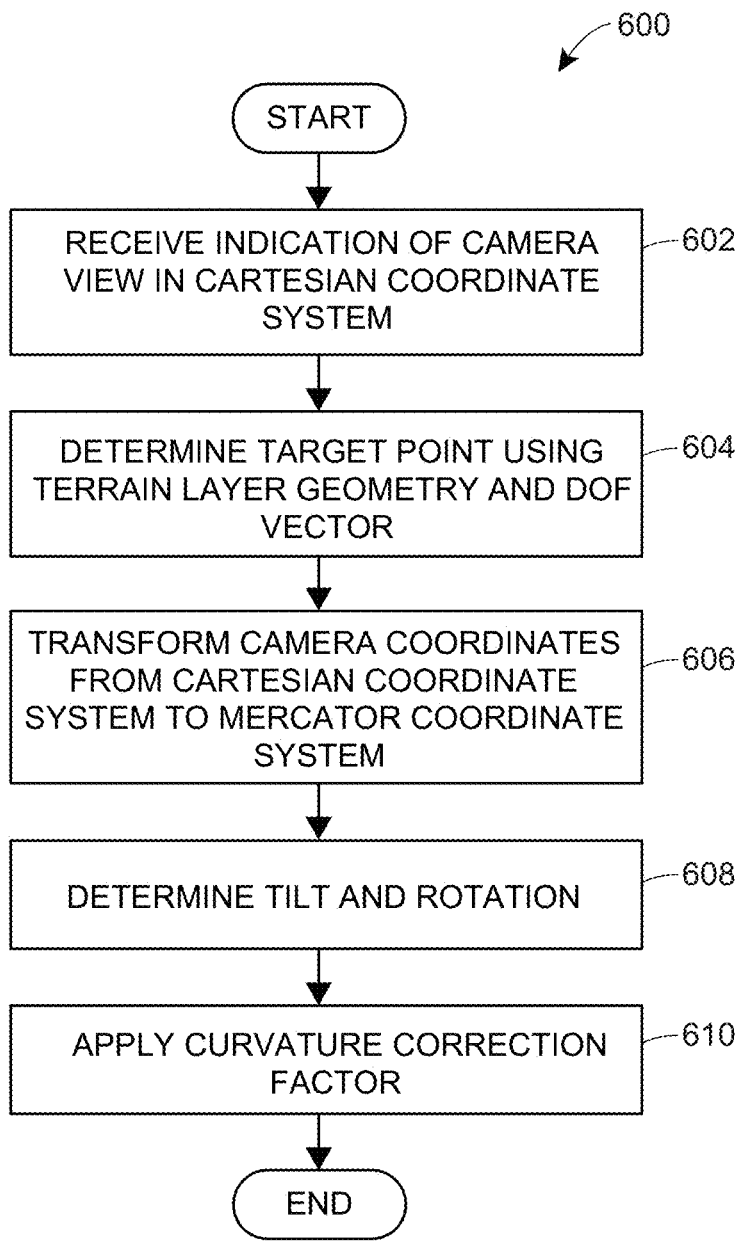
FIG. 6A is a flow diagram of an example method for generating 2D map texture in accordance with a perspective of a camera relative to a 3D scene that may operate in the system of FIG. 1.

Referring next to FIG. 6A, an example method 600 for generating 2D map texture in accordance with a perspective of a camera relative to a 3D scene can be implemented in a 2D texture rendering engine, such as the engine 120 of FIG. 1 or the engine 304 of FIG. 3A, for example. According to this method, as 3D camera view, which is an indication of a camera view in a Cartesian coordinate system or another suitable 3D coordinate system, is received at block 602. Next, at block 604, a target point on a surface of a 2D map is determined using terrain layer geometry and a direction of flight (DOF) vector. The coordinates of the camera are transformed from the Cartesian coordinate system to the Mercator coordinate system of the 2D map at block 606, and the tilt and rotation of the 3D camera relative to the 2D map are determined at block 608. If desired, a curvature correction factor may be determined and applied to the target distance parameter of the 2D camera view at block 610.

Figure 6B:
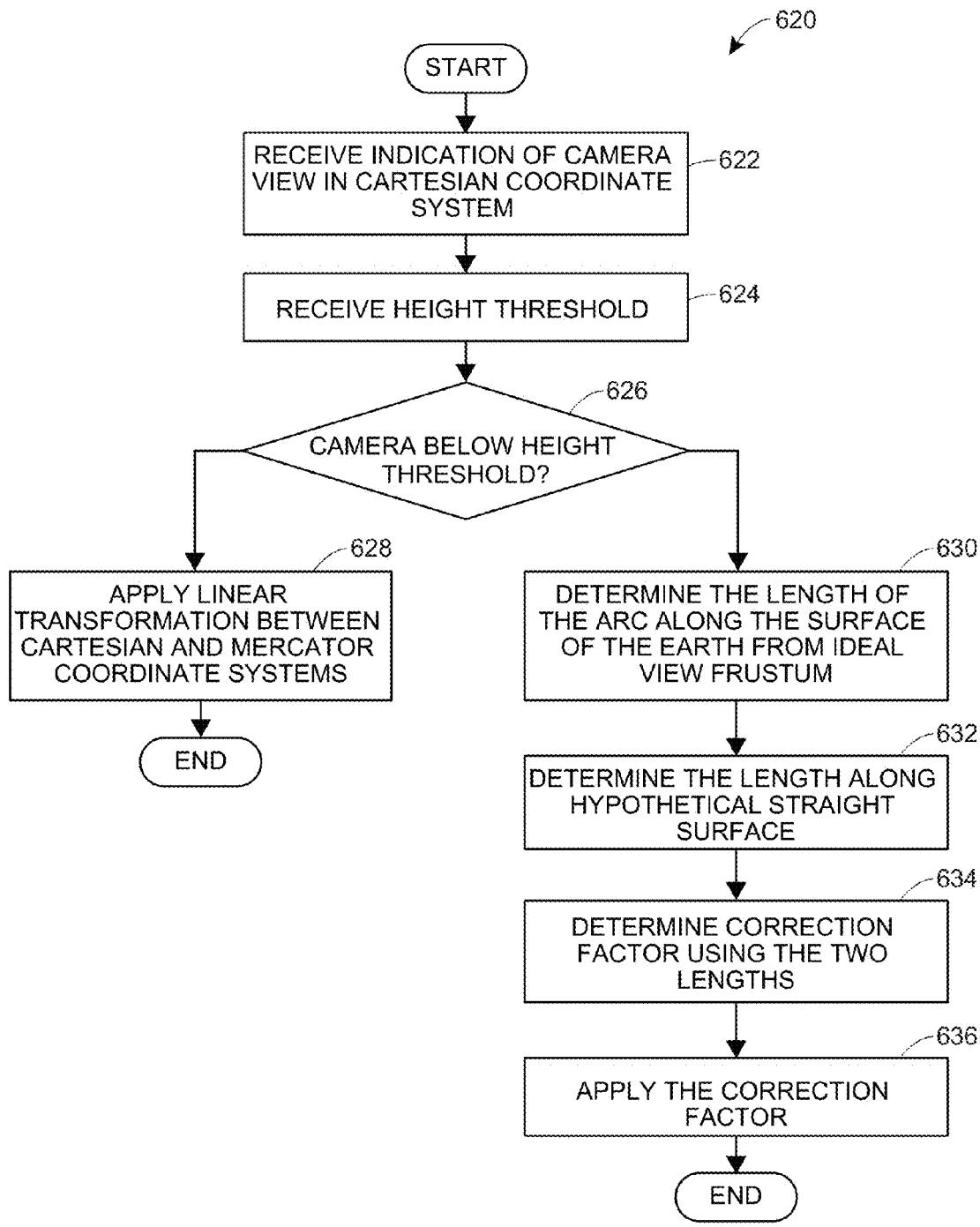
FIG. 6B is a flow diagram of an example method that may operate in the system of FIG. 1 for selectively correcting camera position due to curvature of the earth.

FIG. 6B illustrates example method 620 that also may be implemented in a 2D texture rendering engine for selectively correcting camera position due to curvature of the Earth.

An indication of a 3D camera view in a Cartesian coordinate system is received at block 622. Next, a height threshold value is received block 624. The height threshold value can be expressed in terms of meters in the physical world represented by the 3D scene. For example, the height threshold value may be 30 meters, and a conversion to z-offset values can be implemented as discussed above.

At block 626, the vertical component of the position of the 3D camera is compared to the height threshold. If the 3D camera is currently positioned lower than the height threshold, a linear transformation between the Cartesian and Mercator coordinate systems is applied (block 628). No curvature factor is applied when the flow proceeds from block 626 down the branch that includes block 628. However, if the 3D camera is currently positioned above the height threshold, the length of the arc along the surface of the earth, arcLen, is determined (block 630). The length along a hypothetical flat surface, flatLen, is also determined (block 632) along a hypothetical straight surface. The arcLen and flatLen values are used to determine a correction factor (block 634) that is applied to the map texture during rendering (block 636), as also discussed above. It is noted also that when the flow proceeds from block 626 down the branch that includes blocks 630-636, non-linear transformation between Cartesian and Mercator is used.

Figure 7A:
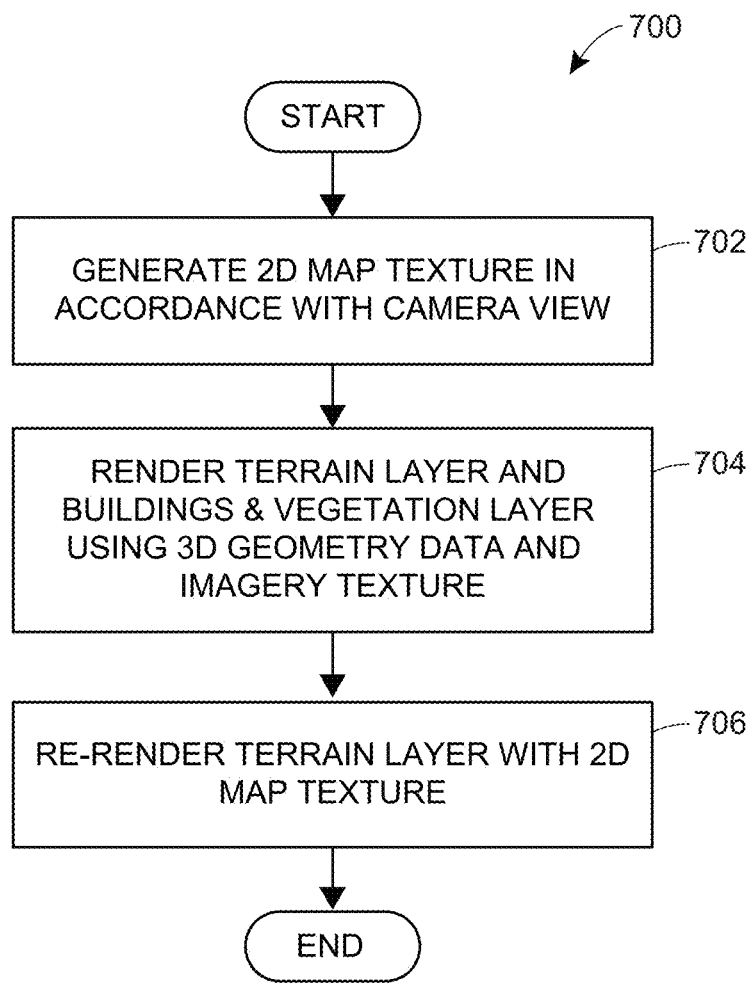
FIGS. 7A-7C are flow diagrams of exemplary methods for augmenting a 3D scene with 2D map that may operate in the system of FIG. 1.
Figure 7B:
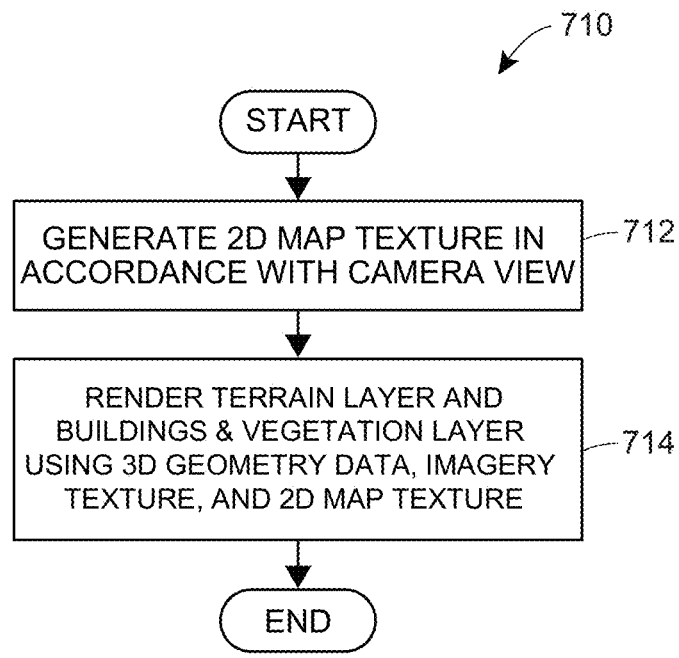
Figure 7C:
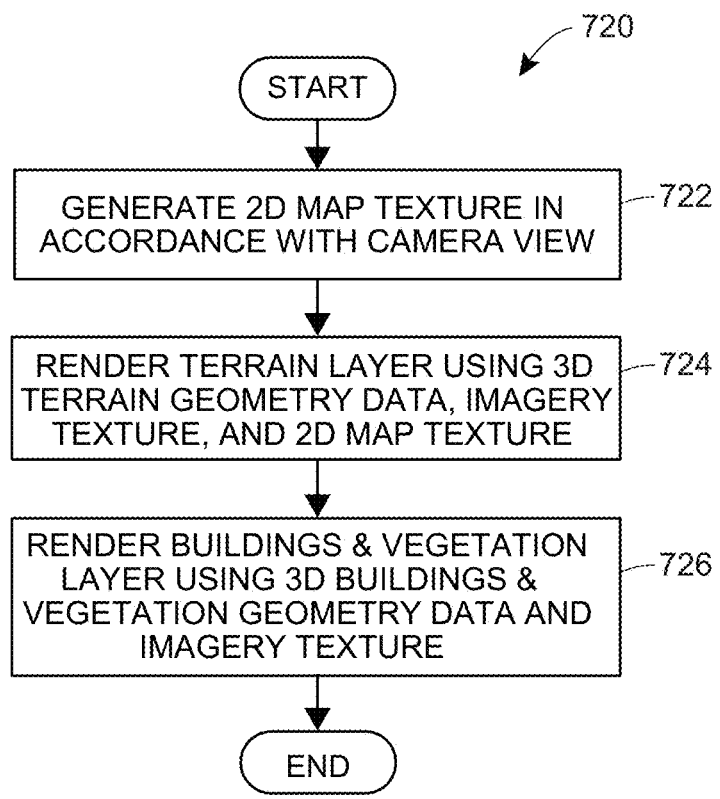

Next, FIGS. 7A-7C illustrate several exemplary methods for augmenting a 3D scene with 2D map that may operate in the system of FIG. 1. These techniques can be implemented in the 2D texture application engine 124, for example. The method of FIG. 7A generally corresponds to the diagram of FIG. 4A, the method of FIG. 7B generally corresponds to the diagram of FIG. 4B, and the method of FIG. 7C generally corresponds to the diagram of FIG. 4C.

Referring first to the method 700 of FIG. 7A, a 2D map texture is generated in accordance with a 2D camera view at block 702. 3D geometry data and imagery texture are used to render a terrain layer as well as a buildings and vegetation layer at block 704. The terrain layer then is re-rendered with the map texture at block 706.

Alternatively, according to the method 710 of FIG. 7B, a 2D map texture is generated in accordance with a 2D camera view at block 712. 3D geometry data, imagery texture, and map texture then are used to render a terrain layer and a buildings and vegetation layer at block 714.

As another alternative, a 3D scene can be augmented with 2D map according to the method 720 of FIG. 7C. At block 722, a map texture is generated in accordance with a 2D camera view. 3D terrain geometry data, imagery texture, and map texture are used to render a terrain layer at block 724. 3D buildings and vegetation geometry data and imagery texture then are used to render a buildings and vegetation layer at block 726.

Figure 8A:
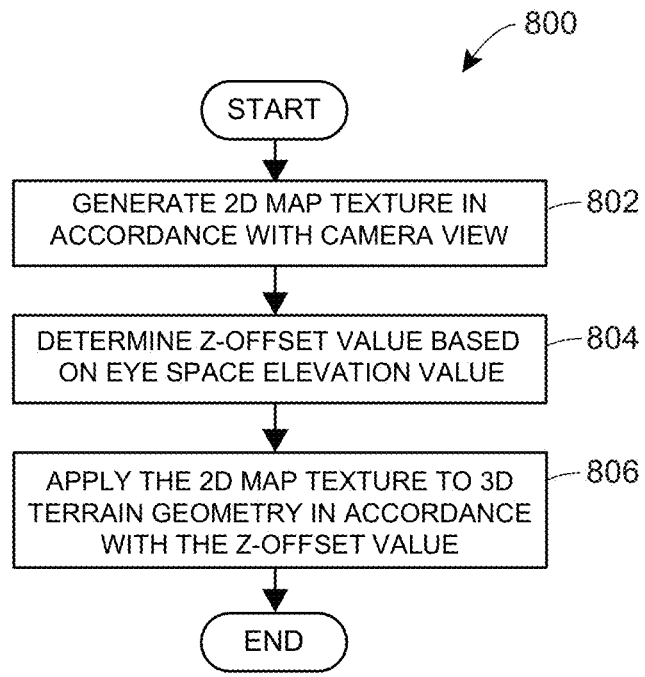
FIG. 8A is a flow diagram of an example method for applying 2D map texture to the terrain layer using elevation that may operate in the system of FIG. 1.

FIG. 8A is a flow diagram of an example method 800 for applying 2D map texture to the terrain layer using elevation that may operate in the system of FIG. 1. The method 800 can be implemented in the 2D texture application engine 124, for example.

A 2D map texture is provided or generated in accordance with a 2D camera view at block 802. A z-offset value is determined based on the eye space elevation value at block 804. At block 806, the 2D map texture is applied to 3D terrain geometry in accordance with the z-offset. As described earlier, the z-offset brings forth the map element information, e.g., path, route, road, by elevating its appearance above some of the buildings and vegetation.

Figure 8B:
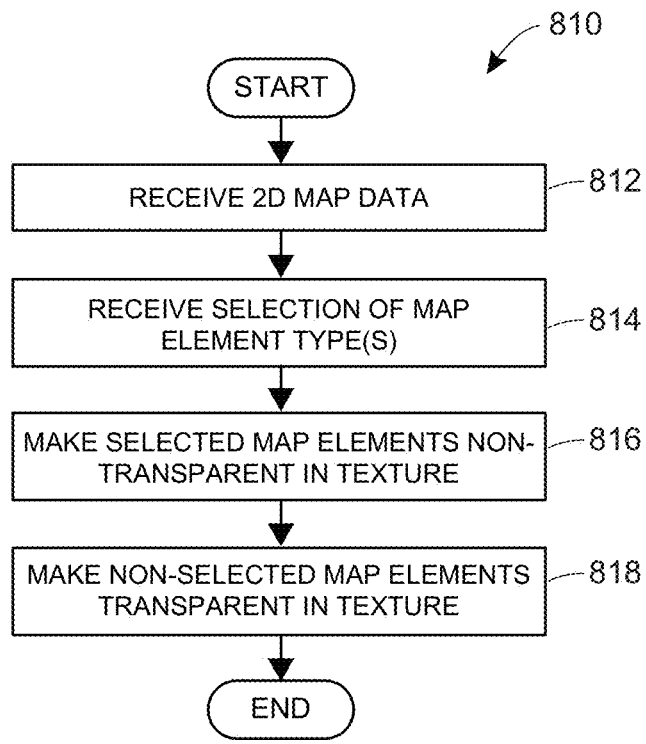
FIG. 8B is a flow diagram of an example method that may operate in the system of FIG. 1 for generating 2D map texture in which non-selected elements are transparent.

FIG. 8B is a flow diagram of an example method 810 that may be implemented in the 3D texture rendering engine 120 or 304, for example.

The method 810 includes receiving 2D map data (block 812) and receiving a selection of one or several desired types of map elements for application to a 3D scene (block 814). The selected map elements may be made non-transparent in the 2D map texture generated using the 2D map data (block 816). Meanwhile, map elements that were note selected at block 814 are made transparent in the 2D map texture (block 818).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for overlaying two-dimensional map data on a three-dimensional scene through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for augmenting three-dimensional (3D) scenes with two-dimensional (2D) map data, the method comprising:
   receiving 3D map data for generating a textured 3D scene, the 3D map data including 3D geometry data and imagery texture data;
   for a specified perspective of a virtual camera in a 3D coordinate system, rendering geometry of the 3D scene using the 3D geometry data, wherein the specified perspective includes a position and orientation relative to the 3D scene;
   generating a map texture using 2D map data in accordance with the perspective of the virtual camera in the 3D coordinate system; and
   applying by one or more processors (i) the imagery texture and (ii) the map texture to the rendered geometry corresponding to a same geographic area to overlay the 2D map data on the 3D scene.

2. The method of claim 1, wherein the 2D map data is parameterized in a coordinate system associated with projecting a spherical surface onto a flat surface.

3. The method of claim 2, wherein the coordinate system in which the 2D map data is parameterized is one of (i) Mercator or (ii) plate carrée.

4. The method of claim 2, wherein the 3D coordinate system is Cartesian.

5. The method of claim 2, wherein generating the map texture includes determining a perspective of the virtual camera relative to a plane with which the 2D map data is associated, including calculating:
   (i) a target point within the 2D map data,
   (ii) a target distance between the virtual camera and the target point,
   (iii) tilt of the virtual camera, and
   (iv) rotation of the virtual camera.

6. The method of claim 5, wherein:
   the 3D geometry data includes (i) terrain layer geometry data (ii) buildings and vegetation layer geometry data, and
   calculating the target point includes determining the intersection between a direction of flight (DOF) vector and terrain layer.

7. The method of claim 5, wherein calculating the target distance includes transforming the position of the virtual camera in the 3D coordinate system to the system in which the 2D map data is parameterized.

8. The method of claim 5, wherein generating the map texture includes applying a curvature factor to the target distance to account for the curvature of the Earth.

9. The method of claim 1, wherein:
   the 3D geometry data includes (i) a first layer geometry data (ii) a second layer geometry data;
   rendering the geometry of the 3D scene includes:
      (i) in a first instance, rendering a first layer using the first layer geometry data and rendering the second layer using the second layer geometry data, and
      (ii) in a second instance, re-rendering the first layer using the first layer geometry data; and
   wherein applying the imagery texture and the map texture includes:
      (i) applying the imagery texture to the rendered first layer and the second layer before the first layer is re-rendered, and
      (ii) applying the map texture to re-rendered first layer.

10. The method of claim 9, wherein applying the map texture to the re-rendered first layer includes applying a depth offset to raise the map texture above the bottom of the second layer.

11. The method of claim 9, wherein the first layer is a terrain layer and the second layer is a buildings and vegetation layer.

12. The method of claim 1, wherein:
   the 3D geometry data includes (i) first layer geometry data (ii) second layer geometry data; and
   rendering the geometry of the 3D scene includes:
      (i) in a first instance, rendering a first layer using the first layer geometry data and not rendering a second layer, and
      (ii) in a second instance, rendering the second layer using the second layer geometry data;
   applying the imagery texture and the map texture includes:
      (i) applying the imagery texture and the map texture to the first layer before the second layer is rendered, and
      (ii) applying the imagery texture to the second layer.

13. The method of claim 12, wherein the first layer is a terrain layer and the second layer is a buildings and vegetation layer.

14. The method of claim 1, wherein generating the map texture includes:
   rendering the 2D map data to a frame buffer of a graphics pipeline, and
   copying the frame buffer into a texture.

15. The method of claim 1, wherein the 2D map data includes vector-based 2D geometry data and map texture data.

16. The method of claim 1, wherein the imagery texture is photographic texture.

17. The method of claim 1, wherein generating the map texture includes:
rendering map elements included in the 2D map data into a texture, and
rendering areas free of map elements into transparent portions of the texture.

18. The method of claim 1, wherein generating the map texture includes:
rendering map elements of a first type included in the 2D map data into the texture, and
rendering map elements of a second type included in the 2D map data into transparent portions of the texture.

19. The method of claim 18, wherein the first type includes at least one of:
(i) roads,
(ii) labels, and
(iii) point of interest (POI) indicators.

20. A computing device comprising:
a user interface including a display device;
one or more processors;
a tangible computer-readable medium storing thereon instructions that, when executed on the one or more processors, cause the computing device to:
receive 2D map data that specifies elements of a digital 2D map, wherein the 2D map data is parameterized in a coordinate system associated with projecting a spherical surface onto a flat surface;
receive 3D map data for generating a textured 3D scene, the 3D map data including 3D geometry data and imagery texture data;
receive an indication of a perspective of a virtual camera relative to the 3D scene in a 3D coordinate system;
using the 2D map data, generate a map texture for application to the 3D scene in accordance with the perspective of the virtual camera; and
apply the map texture and the imagery texture data to the 3D scene, at a location corresponding to a same geographic area, to overlay the 2D map data on the 3D scene.

21. The computing device of claim 20, wherein to generate the map texture, the instructions cause the computing device to calculate:
(i) a target point within the 2D map data,
(ii) a target distance between the virtual camera and the target point,
(iii) tilt of the virtual camera, and
(iv) rotation of the virtual camera.

22. The computing device of claim 21, wherein:
the 3D geometry data includes (i) terrain layer geometry data (ii) buildings and vegetation layer geometry data, and
to calculate the target point, the instructions cause the computing device to determine the intersection between a direction of flight (DOF) vector and terrain layer.

23. The computing device of claim 21, wherein:
to generate the map texture, the instructions cause the computing device to apply a curvature factor to the target distance to account for the curvature of the Earth.

24. The computing device of claim 20, further comprising:
a graphics processor;
wherein the instructions include a shader program executable on the graphics processor to blend the map texture over the 3D scene.

25. The computing device of claim 20, wherein to generating the map texture, the instructions cause the computing device to:
render map elements of a first type included in the 2D map data into the texture, and
render map elements of a second type included in the 2D map data into transparent portions of the texture.

26. The computing device of claim 20, wherein the coordinate system in which the 2D map data is parameterized is one of (i) Mercator or (ii) plate carrée.

27. A tangible non-transitory computer-readable medium storing thereon instructions that, when executed by one or more processors, cause the one or more processors to:
receive 3D map data that includes 3D geometry data and imagery texture data;
for a specified perspective of a virtual camera in a 3D coordinate system, render geometry of the 3D scene using the 3D geometry data, wherein the specified perspective includes a position and orientation relative to the 3D scene;
cause a map texture to be generated using the 2D map data in accordance with the perspective of the virtual camera in the 3D coordinate system; and
cause (i) the imagery texture and (ii) the map texture to be applied to the rendered geometry corresponding to a same geographic area to overlay the 2D map data on the 3D scene.

* * * * *